United States Patent
Muff et al.

(10) Patent No.: US 9,652,238 B2
(45) Date of Patent: *May 16, 2017

(54) INSTRUCTION SET ARCHITECTURE WITH OPCODE LOOKUP USING MEMORY ATTRIBUTE

(71) Applicant: International Business Machines Corporation, Armonk, NY (US)

(72) Inventors: Adam J. Muff, Woodinville, WA (US); Paul E. Schardt, Rochester, MN (US); Robert A. Shearer, Woodinville, WA (US); Matthew R. Tubbs, Issaquah, WA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/054,497

(22) Filed: Feb. 26, 2016

(65) Prior Publication Data

US 2016/0179693 A1 Jun. 23, 2016

Related U.S. Application Data

(63) Continuation of application No. 14/839,577, filed on Aug. 28, 2015, now Pat. No. 9,286,071, which is a continuation of application No. 13/948,684, filed on Jul. 23, 2013, now Pat. No. 9,292,290.

(51) Int. Cl.
*G06F 9/30* (2006.01)
*G06F 12/10* (2016.01)

(52) U.S. Cl.
CPC ........ *G06F 9/30145* (2013.01); *G06F 9/3016* (2013.01); *G06F 9/30149* (2013.01); *G06F 12/10* (2013.01)

(58) Field of Classification Search
None
See application file for complete search history.

(56) References Cited

U.S. PATENT DOCUMENTS

| | | | |
|---|---|---|---|
| 5,854,913 A * | 12/1998 | Goetz | G06F 9/30174 711/207 |
| 6,651,160 B1 | 11/2003 | Hays | |
| 7,069,421 B1 | 6/2006 | Yates, Jr. et al. | |
| 7,340,588 B2 | 3/2008 | Altman et al. | |
| 7,617,388 B2 | 11/2009 | Kissell | |
| 7,852,341 B1 | 12/2010 | Rouet et al. | |

(Continued)

OTHER PUBLICATIONS

U.S. Patent and Trademark Office, Notice of Allowanced issued in related U.S. Appl. No. 13/948,684 dated Dec. 1, 2015.

(Continued)

*Primary Examiner* — Cheng-Yuan Tseng
(74) *Attorney, Agent, or Firm* — Middleton Reutlinger (57) ABSTRACT

A circuit arrangement decodes instructions based in part on one or more decode-related attributes stored in a memory address translation data structure such as an Effective To Real Translation (ERAT) or Translation Lookaside Buffer (TLB). A memory address translation data structure may be accessed, for example, in connection with a decode of an instruction stored in a page of memory, such that one or more attributes associated with the page in the data structure may be used to control how that instruction is decoded.

20 Claims, 7 Drawing Sheets

(56) References Cited

U.S. PATENT DOCUMENTS 8,195,923 B2 6/2012 Spracklen et al.
2013/0275721 A1 10/2013 Lin et al.

OTHER PUBLICATIONS

U.S. Patent and Trademark Office, Notice of Allowanced issued in related U.S. Appl. No. 14/839,577 dated Dec. 3, 2015.
U.S. Patent and Trademark Office, Office Action issued in related U.S. Appl. No. 15/054,515 dated 09/19/2016.

* cited by examiner

INSTRUCTION SET ARCHITECTURE WITH OPCODE LOOKUP USING MEMORY ATTRIBUTE

FIELD OF THE INVENTION

The invention is generally related to data processing, and in particular to instruction set architectures for processors and computers incorporating the same.

BACKGROUND OF THE INVENTION

The fundamental task of every computer processor is to execute computer programs. How a processor handles this task, and how computer programs must present themselves to a processor for execution, are governed by both the instruction set architecture (ISA) and the microarchitecture of the processor. An ISA is analogous to a programming model, and relates principally to how instructions in a computer program should be formatted in order to be properly decoded and executed by a processor, although an ISA may also specify other aspects of the processor, such as native data types, registers, addressing modes, memory architecture, interrupt and exception handling, and external I/O. The microarchitecture principally governs lower level details regarding how instructions are decoded and executed, including the constituent parts of the processor (e.g., the types of execution units such as fixed and floating point execution units) and how these interconnect and interoperate to implement the processor's architectural specification.

An ISA typically includes a specification of the format of each type of instruction that is capable of being executed by a particular processor design. Typically, an instruction will be encoded to include an operational code, or opcode, that identifies the type of instruction, (i.e., the type of operation to be performed when the instruction is executed), as well as one or more operands that identify input and/or output data to be processed by the instruction. In many processor designs, for example Reduced Instruction Set Computer (RISC) and other load-store designs, data is principally manipulated within a set of general purpose registers (GPR's) (often referred to as a "register file"), with load and store instructions used to respectively retrieve input data into GPR's from memory and store result or output data from GPR's and back into memory. Thus, for a majority of the instructions that manipulate data, the instructions specify one or more input or source registers from which input data is retrieved, and an output or destination register to which result data is written.

Instructions are typically defined in an ISA to be a fixed size, e.g., 32 bits or 64 bits in width. While multiple 32 or 64 bit values may be used to specify an instruction, the use of multiple values is undesirable because the multiple values take more time to propagate through the processor and significantly increase design complexity. With these fixed instruction widths, only a limited number of bits are available for use as opcodes and operands.

Each unique instruction type conventionally requires a unique opcode, so in order to support a greater number of instruction types (a continuing need in the industry), additional bits often must be allocated to the opcode portion of an instruction architecture. In some instances, opcodes may be broken into primary and secondary opcodes, with the primary opcode defining an instruction type and the secondary opcode defining a subtype for a particular instruction type; however, even when primary and secondary opcodes are used, both opcodes occupy bit positions in each instruction.

Likewise, a continuing need exists for expanding the number of registers supported by an ISA, since improvements in fabrication technology continue to enable greater numbers of registers to be architected into an integrated circuit, and in general performance improves as the number of registers increases.

Each register requires a unique identifier as well, so as the number of registers increases, the number of bit positions in each instruction required to identify all supported registers likewise increases.

As an example, consider a processor architecture that supports 32-bit instructions with 6-bit primary opcode fields, and thus supports a total of 64 types, or classes of instructions. If, for example, it is desirable to implement within this architecture a class of instructions that identifies up to three source registers and a separate destination register from a register file of 64 registers, each operand requires a 6-bit operand field. As such, 6 bits are needed for the primary opcode, 18 bits are needed for the source register addresses and 6 bits are needed for the target register address, leaving only 2 bits for an extended opcode, and allowing for only four possible instructions in this instruction class.

Implementing a register file of 128 registers using 32-bit instructions is even more problematic. If, for example, some of the instructions in a class of an instruction set architecture required three source registers and one target register, the operands would require 28 bits (7 bits per operand), only four bits would be available for any primary and/or secondary opcode. Thus, for example, if four bits were required for a primary opcode to identify a particular instruction class, that instruction class would be limited to a single instruction, since there would be no space for any secondary or extended opcode.

In most instances, however, more instruction types are needed for an architecture to be useful. For instance, an instruction class for performing floating point operations may need instruction types that perform addition, subtraction, multiplication, fused multiply-add operations, division, exponentiation, trigonometric operations, comparison operations, and others.

Conventional attempts have been made to address these limitations. For example, three-source operations may be made destructive, meaning the target and one source address would be implicitly equal, such that one address field in the above example would not be needed, freeing up space for additional extended opcodes. Destructive operations, however, are often not convenient for compilers and software engineers, because often times an extra copy of the source data that would be overwritten by the destructive operation needs to be saved away in a temporary register, which can have potential performance problems in addition to using valuable temporary register space.

Therefore, a significant need continues to exist in the art for a manner of increasing the number and complexity of instructions supported by an instruction set architecture.

SUMMARY OF THE INVENTION

The invention addresses these and other problems associated with the prior art by providing a circuit arrangement that decodes instructions based in part on one or more decode-related attributes stored in a memory address translation data structure such as an Effective To Real Translation (ERAT) or Translation Lookaside Buffer (TLB). A memory address translation data structure may be accessed, for example, in connection with a decode of an instruction stored in a page of memory, such that one or more attributes associated with the page in the data structure may be used to control how that instruction is decoded. In some embodiments, for example, a memory attribute may be used to access a table of software loadable primary opcodes for an instruction, such that the primary opcode indexed by the memory attribute will be used, either alone or in combination with other information in the instruction, to decode the instruction. By doing so, additional space is freed up in the instruction to support a larger register file and/or additional instruction types, e.g., as specified by a secondary or extended opcode.

Therefore, consistent with one aspect of the invention, instructions from an instruction set architecture are executed in a processing unit by, in response to receiving an instruction in an instruction stream, accessing a decode-related attribute in a memory address translation data structure, where the instruction is associated with an address at which the instruction is stored in an address space, where the memory address translation data structure is used to perform memory address translation for instructions in the instruction stream, and where the decode-related attribute is accessed using at least a portion of the address; and decoding at least a portion of an opcode for the instruction using the decode-related attribute.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Embodiments consistent with the invention decode an instruction based in part on one or more decode-related attributes stored in a memory address translation data structure, which may be used, for example, to access an opcode table or other data structure to determine at least a portion of an opcode for the instruction. A memory address translation data structure such as a page table entry (PTE) stored in an ERAT or TLB may be accessed, for example, in connection with a decode of an instruction stored in a page of memory, such that one or more attributes associated with the page in the data structure may be used to control how that instruction is decoded.

A decode-related attribute for use in connection with address translation-based instruction decode may include, for example, an index, or a portion of an index, which may be used to access an opcode table or other data structure. Other attributes that may be used to decode an instruction, including, for example, all or a portion of an opcode, may be stored in a memory address translation data structure in the alternative.

Other variations and modifications will be apparent to one of ordinary skill in the art. Therefore, the invention is not limited to the specific implementations discussed herein.

Hardware and Software Environment

Figure 1:
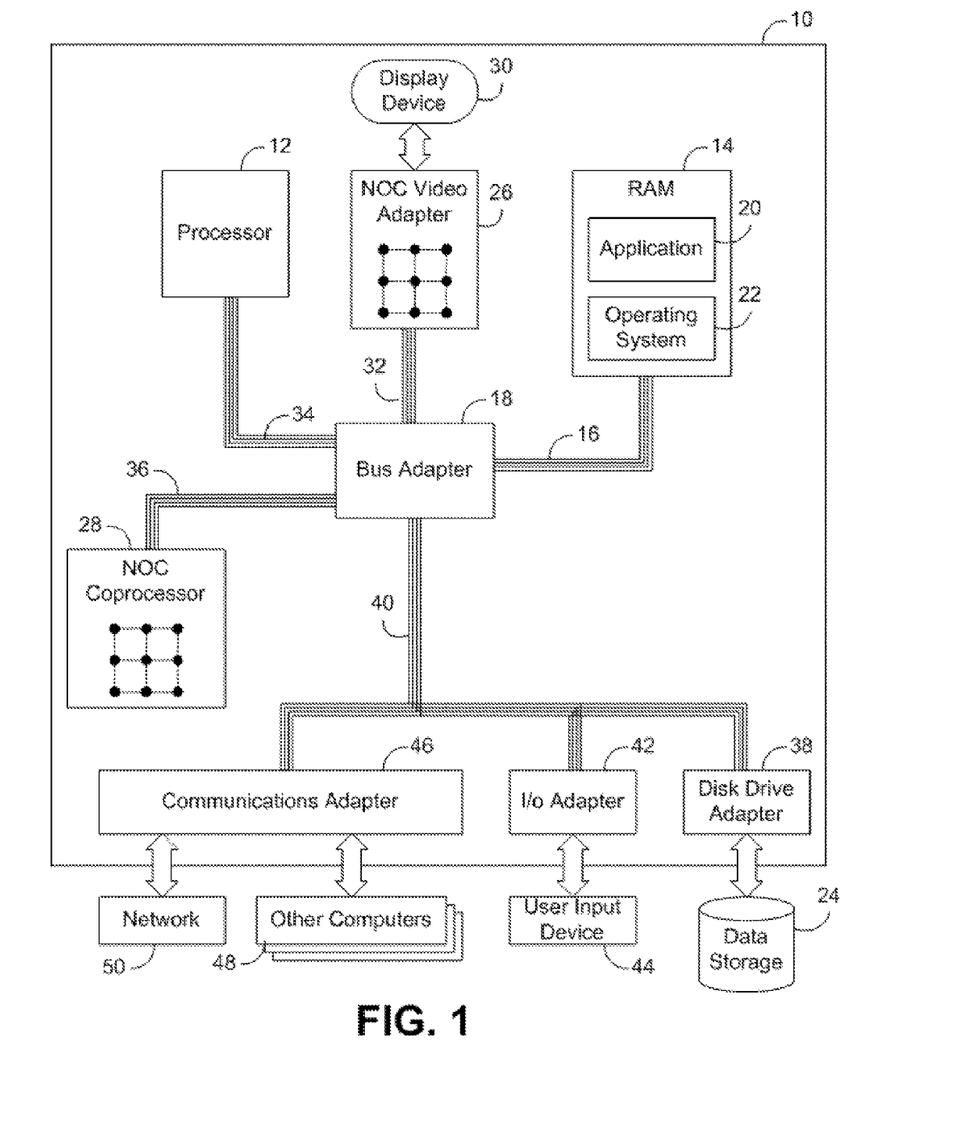
FIG. 1 is a block diagram of exemplary automated computing machinery including an exemplary computer useful in data processing consistent with embodiments of the present invention.

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™ Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
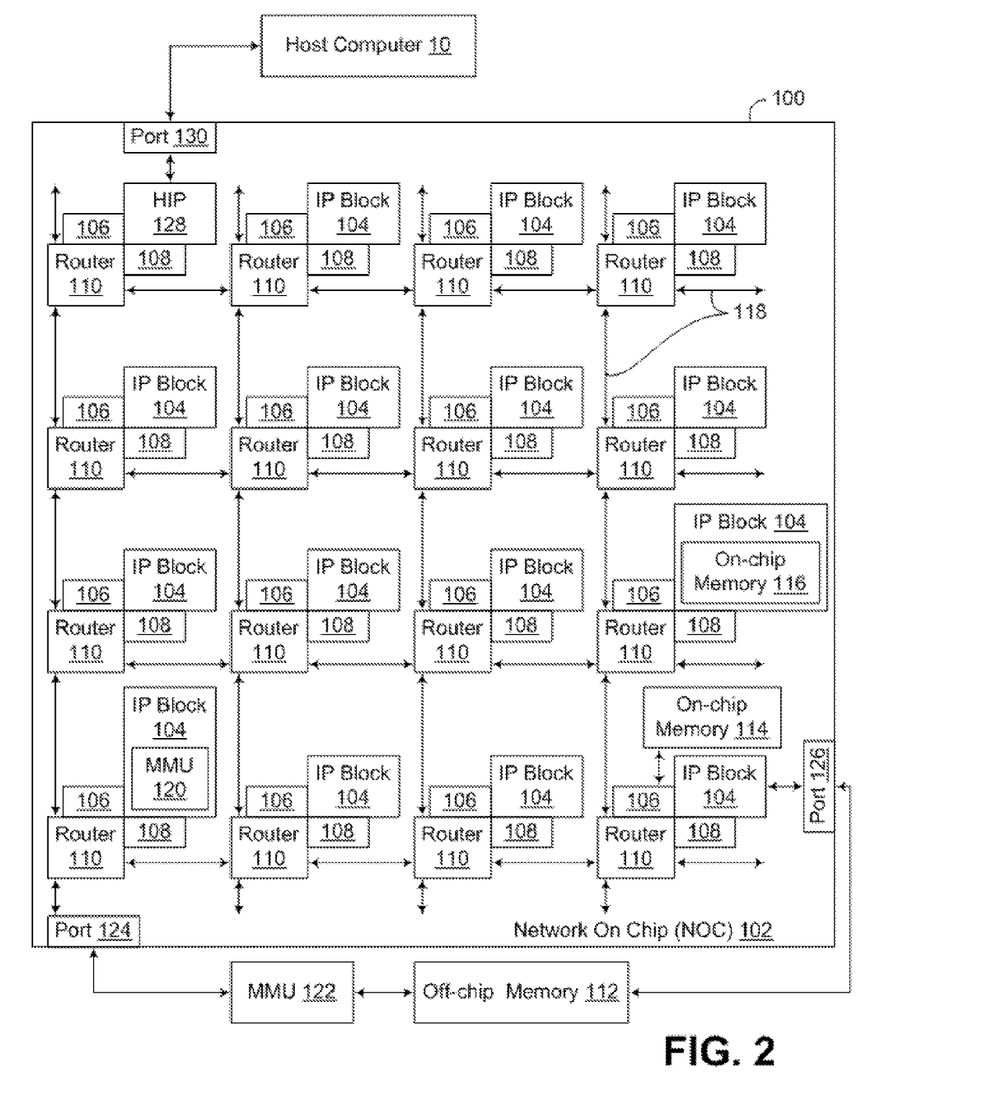
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices, data processing systems utilizing such devices, and other tangible, physical hardware circuits, those of ordinary skill in the art having the benefit of the instant disclosure will appreciate that the invention may also be implemented within a program product, and that the invention applies equally regardless of the particular type of computer readable storage medium being used to distribute the program product. Examples of computer readable storage media include, but are not limited to, physical, recordable type media such as volatile and non-volatile memory devices, floppy disks, hard disk drives, CD-ROMs, and DVDs (among others).

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
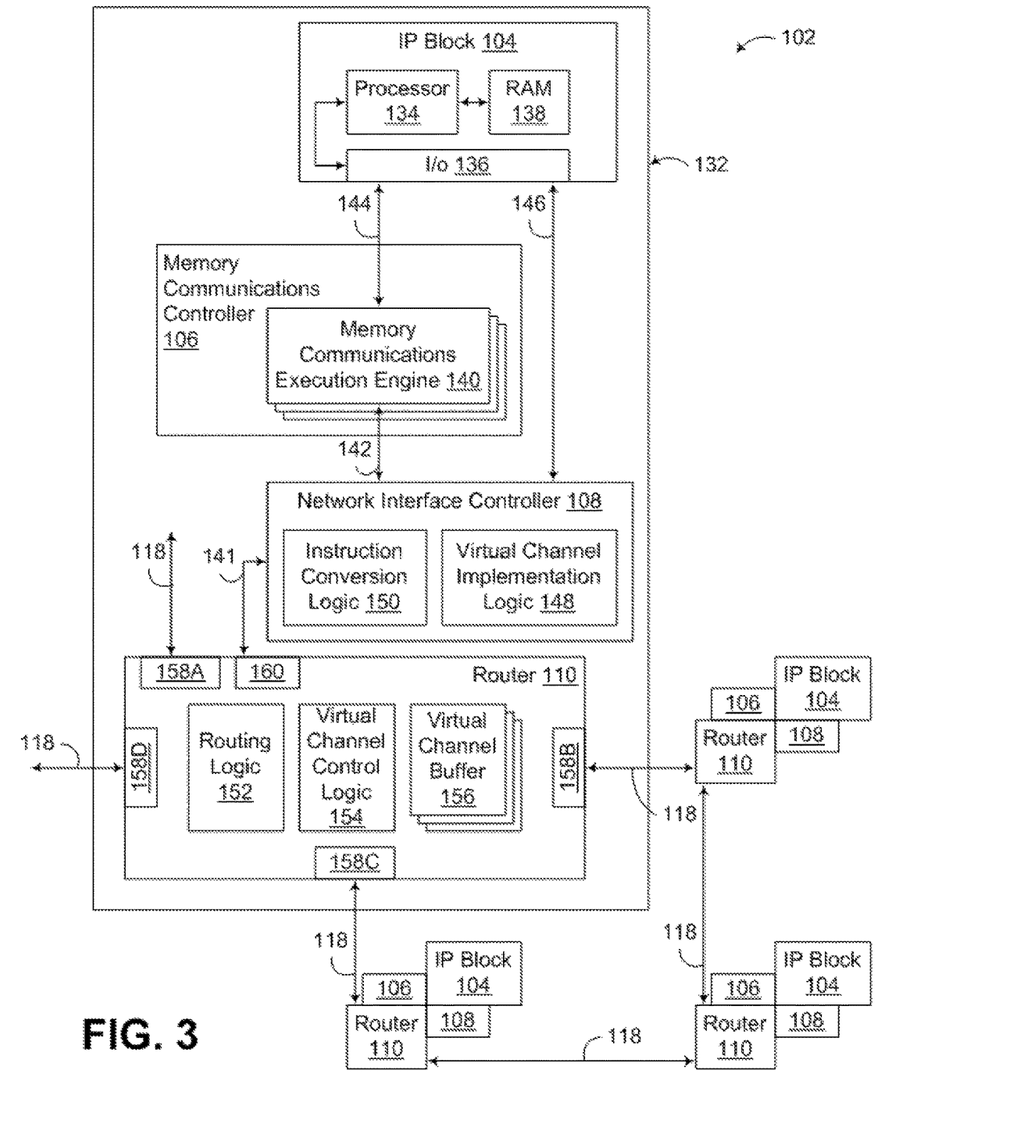
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
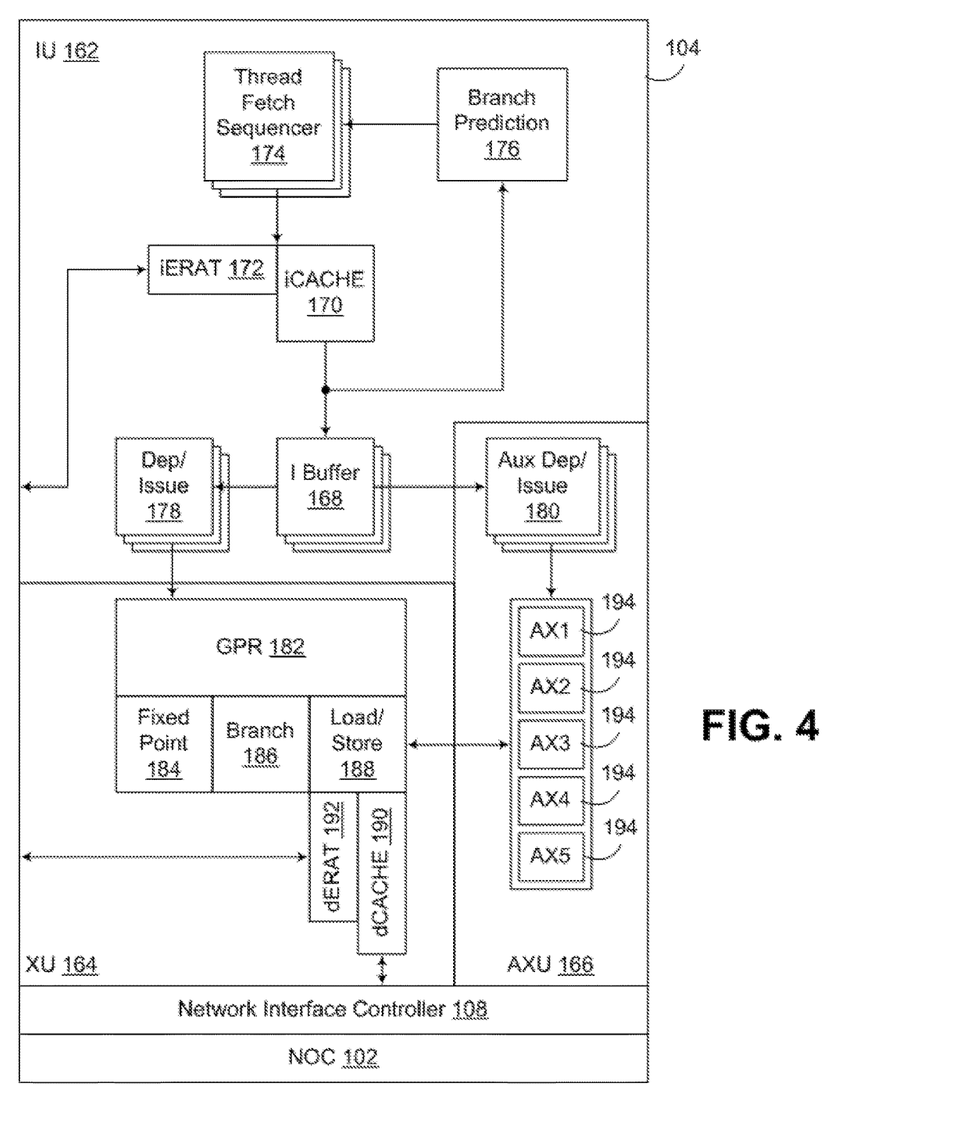
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an issue or instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Address Translation-Based Instruction Decode

Processor instructions have an opcode for each type of operation that is represented by a unique bit pattern in the data that makes up the instruction. Due to the ever expanding number of registers in modern processor cores, the address widths present in the instruction encoding continue to widen, taking up valuable instruction encoding space for adding new instruction decodes. Additionally, it is typically desirable that all instructions have the same fixed width in a microprocessor architecture. Introducing variable width instructions often causes great design complexity that would impact performance negatively.

If, for example, it was desirable to add a new class of instructions to an instruction set architecture such as the existing Power instruction set architecture to support 128 registers, each address width in the new instructions would equal 7. In addition, if some of the new instructions needed to address three source registers (VA, VB, VC) and one target register (VT), 28 bits, 21 bits for the source register addresses and 7 bits for the target register address. As such, there would only be a total of four bits available for any primary and/or secondary opcode.

For instance, it may be desirable for a new instruction class to include floating point instruction types that perform addition, subtraction, multiplication, fused multiply-add operations, division, exponentiation, trigonometric operations, comparison operations, and others. One conventional approach to address this situation would be to make the 3-source operations destructive, meaning the target and one source address would be implicitly equal, such that one address field in the above example would not be needed, freeing up space for additional extended opcodes. But these destructive operations are often not convenient for compilers and software engineers, because often times an extra copy of the source data that would be overwritten by the destructive operation needs to be saved away in a temporary register, which can have potential performance problems in addition to using valuable temporary register space.

One major reason why instruction set architectures strive for large numbers of registers is so that loops can be "unrolled" to minimize branch misprediction performance penalties, and may also in certain cases be used to minimize the performance impact of dependent instructions. The large numbers of registers are needed to do "spills and fills" of data without reusing the same register in a loop. Consider the following example equation (1) where a long Taylor series approximation is computed for sin(x) with many iterations:

$$\sin(x) \approx x - \frac{x^3}{3!} + \frac{x^5}{5!} - \frac{x^7}{7!} + \frac{x^9}{9!} - \frac{x^{11}}{11!} + \frac{x^{13}}{13!} - \frac{x^{15}}{15!} \quad (1)$$

Table I below, for example, illustrates a first loop unrolling, while Table II below illustrates the results of loop unrolling twice, where registers f1 through f10 are used for the most significant part of the approximation, and f11 thru f20 are used for the least significant (starts with the $x^{13}/13!$ term), and they are summed together at the end:

TABLE I

Instruction sequence for Taylor series approximation

```
# initially:
# f1, f2, f10 contain x
# f3, f4, f6, f8 contain 1.0
# f7 contains −1.0
loop:   fmul f2, f1, f2     # f1 contains x, initially f2 contains x also
        fmul f2, f1, f2     # f2 now contains x raised to the desired exp
        fadd f3, f3, f6     # increment the counter, initially contains 1
        fmul f4, f3, f4     # f4 contains the running factorial, init 1
        fadd f3, f3, f6     # increment the counter
        fmul f4, f3, f4     # f4 contains the running factorial
        fdiv f5, f6, f4     # f5 now has the reciprocal of the factorial
        fmul f8, f7, f8     # flip the sign appropriately
        fmul f9, f5, f2     # multiply the reciprocal with the x component
        fmadd f10, f9,      # correct the sign and add to the sum in f10
          f8, f10
        fcmp f3, end        # compare counter (exponent) to end
        blt loop            # branch back to loop if f3 < end
```

TABLE II

Instruction sequence with loop unrolling twice

```
# initially:
# f1, f2, f10 contain x
# f3, f4, f6, f8 contain 1.0
# f7 contains −1.0
# f11, f12, f20 contain x
# f13, f14, f16, f18 contain 1.0
# f17 contains −1.0
# end contains 5
loop:   fmul f2, f1, f2        # f1 contains x, initially f2 contains x also
        fmul f12, f11, f12     #
        fmul f2, f1, f2        # f2 now contains x raised to the desired exp
        fmul f12, f11, f12     #
        fadd f3, f3, f6        # increment the counter, initially contains 1
        fadd f13, f13, f16     #
        fmul f4, f3, f4        # f4 contains the running factorial, init 1
        fmul f14, f13, f14     #
        fadd f3, f3, f6        # increment the counter
        fadd f13, f13, f16     #
        fmul f4, f3, f4        # f4 contains the running factorial
        fmul f14, f13, f14     #
        fdiv f5, f6, f4        # f5 now has the reciprocal of the factorial
        fdiv f15, f16, f14     #
        fmul f8, f7, f8        # flip the sign appropriately
        fmul f18, f17, f18     #
        fmul f9, f5, f2        # multiply the reciprocal with the x component
        fmul f19, f15, f12     #
        fmadd f10, f9, f8,     # correct the sign and add to the sum in f10
          f10
        fmadd f20, f19,        # correct the sign and add to the sum in f20
          f18, f20
        fcmp f3, end           # compare counter (exponent) to end
        blt loop               # branch back to loop if f3 < end
        fadd f10, f10, f20     # sum
```

Note that to minimize branch mispredict penalties, loops and other performance reasons it would be desirable to unroll further than two times typically, but for brevity's sake the example shown above is only unrolled two times. Note that to unroll the loop 4 times, approximately 40 registers would be needed, which would push the limits of many architectures. Notice also in the example above that there is a long string of floating-point only instructions that have the same primary opcode. It will also be appreciated that other types of algorithms benefit from loop unrolling and large register files, e.g., rasterization, fast Fourier transforms, etc.

Embodiments consistent with the invention utilize specialized hardware that uses at least one memory attribute to perform a lookup into a table or other data structure of software loadable opcodes, which often allows for larger register files and/or frees up valuable opcode space for other instructions, and in many instances reduces or avoids compiler complexity. The memory attribute is stored in a page table entry (PTE) stored in an ERAT, TLB or other address translation data structure. The PTE is associated with a page or other region of memory within which one or more instructions are stored, such that the address of the instruction in an address space is used in part to decode the instruction.

Figure 5:
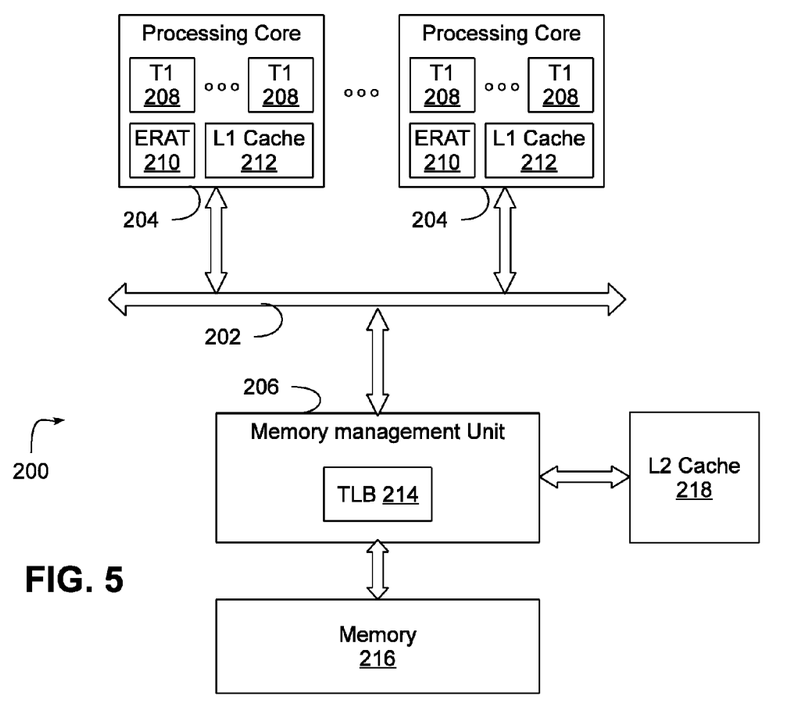
FIG. 5 is a block diagram of an exemplary data processing system incorporating memory address translation-based instruction decoding consistent with the invention.

FIG. 5, for example, illustrates an exemplary data processing system 200 suitable for implementing address translation-based instruction decode consistent with the invention. System 200 is illustrated with a memory bus 202 coupling together a plurality of processing cores 204 to a memory management unit (MMU) 206. While only two processing cores 204 are illustrated in FIG. 5, it will be appreciated that any number of processing cores may be utilized in different embodiments of the invention.

Each processing core 204 is an SMT core including a plurality (N) of hardware threads 208, along with an Effective To Real Translation (ERAT) unit 210 and integrated L1 cache 212. ERAT 210, as is understood in the art, serves as a cache for memory address translation data, e.g., page table entries (PTEs), and is typically associated with a lower level data structure, e.g., a translation lookaside buffer (TLB) 214 disposed in or otherwise accessible to MMU 206. TLB 214 may also serve as a cache for a larger page table, which is typically stored in a memory 216.

The memory system may include multiple levels of memory and caches, and as such, data processing system 200 is illustrated including an L2 cache 218 coupled to MMU 206 and shared by processing cores 204. It will be appreciated, however, that various alternative memory architectures may be utilized in other embodiments of the invention. For example, additional levels of cache memory, e.g., L3 caches, may be used, and memory 216 may be partitioned in some embodiments, e.g., in Non-Uniform Memory Access (NUMA)-based data processing systems. Furthermore, additional cache levels may be dedicated to particular processing cores, e.g., so that each processing core includes a dedicated L2 cache, which may be integrated into the processing core or coupled between the processing core and the memory bus. In some embodiments, an L2 or L3 cache may be coupled directly to the memory bus, rather than via a dedicated interface to an MMU.

In addition, it will be appreciated that the components illustrated in FIG. 5 may be integrated onto the same integrated circuit device, or chip, or may be disposed in multiple such chips. In one embodiment, for example, each processing core is implemented as an IP block in a NOC arrangement, and bus 202, MMU 206 and L2 cache 218 are integrated onto the same chip as the processing cores in an SoC arrangement. In other embodiments, bus 202, MMU 206, L2 cache 218, and/or memory 216 each may be integrated on the same chip or in different chips from the processing cores, and in some instances processing cores may be disposed on separate chips.

Given the wide variety of known processor and memory architectures with which the invention may be utilized, it will therefore be appreciated that the invention is not limited to the particular memory architecture illustrated herein.

Figure 6:
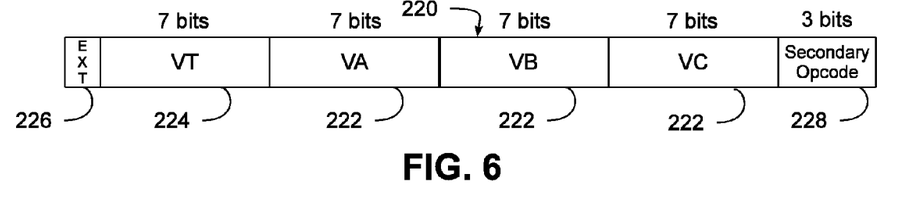
FIG. 6 is a block diagram of an exemplary instruction format for a stored instruction in the instruction buffer referenced in FIG. 5.

To implement address translation-based instruction decode consistent with the invention, an instruction set architecture (ISA) for one or more processing cores 204 in data processing system 200 defines at least one set or class of instructions, referred to herein as extended decode mode instructions, that are decoded in part using one or more memory attributes stored in a PTE. FIG. 6, for example, illustrates an exemplary instruction layout for a non-destructive 32-bit extended decode mode instruction 220 having three source operands 222 (VA, VB, VC) and one target operand 224 (VT), and suitable for implementing address translation-based instruction decode consistent with the invention.

Each operand in instruction 220 is 7 bits in length, thereby enabling up to 128 registers to be referenced for each operand. The remaining 4 bits in this instruction are allocated between an extended decode mode bit 226 and a 3-bit secondary opcode 228. Extended decode mode bit 226 is used to indicate whether an extended decode mode is to be used for the instruction, while the secondary opcode 228 may be used to select from among up to 8 different sub-types for the instruction type defined by a memory attribute associated with the page or region of memory in which the instruction is stored.

As will become more apparent below, a wide variety of alternate instruction formats may be used consistent with the invention. For example, rather than allocating bits to a secondary opcode, additional bits may be allocated to the operands, e.g., to support the ability to address up to 256 registers for each source operand. Alternatively, one or more bits may be allocated to immediate data, and in some embodiments, one or more bits may be used to generate an index into an opcode table in conjunction with the memory attribute. In other embodiments, no secondary opcode may be used and/or all 4 bits may be used for a primary opcode (with one or more of the 16 possible primary opcodes indicating that memory address translation-based instruction decode should be used. In still other embodiments, multiple opcode tables may be supported and accessed for different opcodes. As another alternative, a record (Rc) bit may be included to control whether status bits are updated in a condition register. Therefore, it will be appreciated that the invention is not limited to the particular instruction formats discussed herein.

Figure 7:
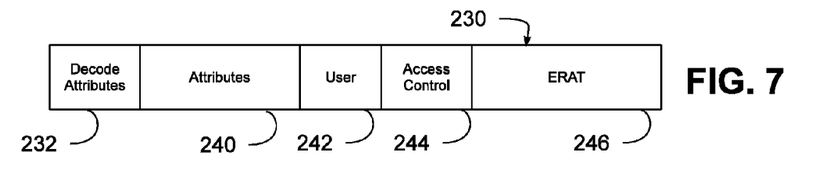
FIG. 7 is a block diagram of an exemplary ERAT entry format for the ERAT referenced in FIG. 5.

As noted above, at least one memory attribute is used to perform a lookup into a table or other data structure of software loadable opcodes. The memory attribute is stored in a page table entry (PTE) stored in an ERAT, TLB or other address translation data structure, and the PTE is associated with a page or other region of memory within which one or more instructions are stored, such that the address of the instruction in an address space is used in part to decode the instruction. FIG. 7, for example, illustrates an exemplary PTE 230 capable of being maintained in an ERAT 210 or TLB 214 (FIG. 5), and extended to include various decode-related memory attributes 232 to support address translation-based instruction decode. Decode memory attributes 232, for example, may define an index into a table of opcodes, with the number of bits N enabling up to $2^N$ opcodes to be indexed in the table.

In addition, while in some embodiments only a single N-bit index is required to implement address translation-based instruction decode, in other embodiments, it may be desirable to provide additional memory attributes useful in controlling how an instruction is decoded, e.g., an attribute that selects which decoder to use if multiple decoders are available. For example, if an AXU has a decoder, it may be desirable to permit an instruction to pass-through the normal decoder and let the AXU decode the instruction. As another alternative, it may be desirable to provide an attribute that forces a flush to a micro-engine for decode. In addition, in some embodiments, no separate opcode data structure may be required, whereby the primary opcode, or at least a portion thereof, is stored directly in the PTE and used to decode all of the extended decode mode instructions in the associated page or memory region.

PTE 230 also stores additional data, similar to conventional PTEs. For example, additional page attributes 240 such as attributes indicating whether a page is cacheable, guarded, or read-only, whether memory coherence or write-through is required, an endian mode bit, etc., may be included in a PTE, as may one or more bits allocated to user mode data 242, e.g., for software coherency or control over cache locking options. An access control page attribute 244 may be provided to control what processes are permitted to access a page of memory, e.g., by specifying a process identifier (PID) associated with the process that is authorized to access the page, or optionally a combination of match and/or mask data, or other data suitable for specifying a set of processes that are authorized to access a page of memory. For example, the access control attribute may mask off one or more LSBs from a PID so that any PID matching the MSBs in the access control attribute will be permitted to access the corresponding memory page. ERAT page attribute 246 stores the effective to real translation data for the PTE, typically including the real address corresponding the effective/virtual address that is used to access the PTE, as well as the effective/virtual address, which is also used to index the ERAT via a CAM function.

It will be appreciated that the format of PTE 230 may also be used in TLB 214 and any other page table resident in the memory architecture. Alternatively, the PTEs stored in different levels of the memory architecture may include other data or omit some data based upon the needs of that particular level of the memory architecture. Furthermore, it will be appreciated that, while the embodiments discussed herein utilize the terms ERAT and TLB to describe various hardware logic that stores or caches memory address translation information in a processor or processing core, such hardware logic may be referred to by other nomenclature, so the invention is not limited to use with ERATs and TLBs. In addition, other PTE formats may be used and therefore the invention is not limited to the particular PTE format illustrated in FIG. 7.

By storing decode-related attributes in a PTE, an opcode, e.g., a primary opcode, may be determined for all of the extended decode mode instructions stored in the page of memory corresponding to the PTE. Typically, this opcode will be decoded the same for every extended decode mode instruction in the page, so it may be desirable to organize instructions that require the same primary opcode in the same page of memory. Other instructions that do not require address translation-based instruction decoding (i.e., non-extended decode mode instructions) may also be provided in the same page of memory, although typically extended decode mode instructions that should be decoded with a different opcode may not be included in the same page of memory. In some embodiments, the memory attributes stored in a PTE may provide multiple indices and thereby support multiple opcodes for the instructions in a page of memory.

Figure 8:
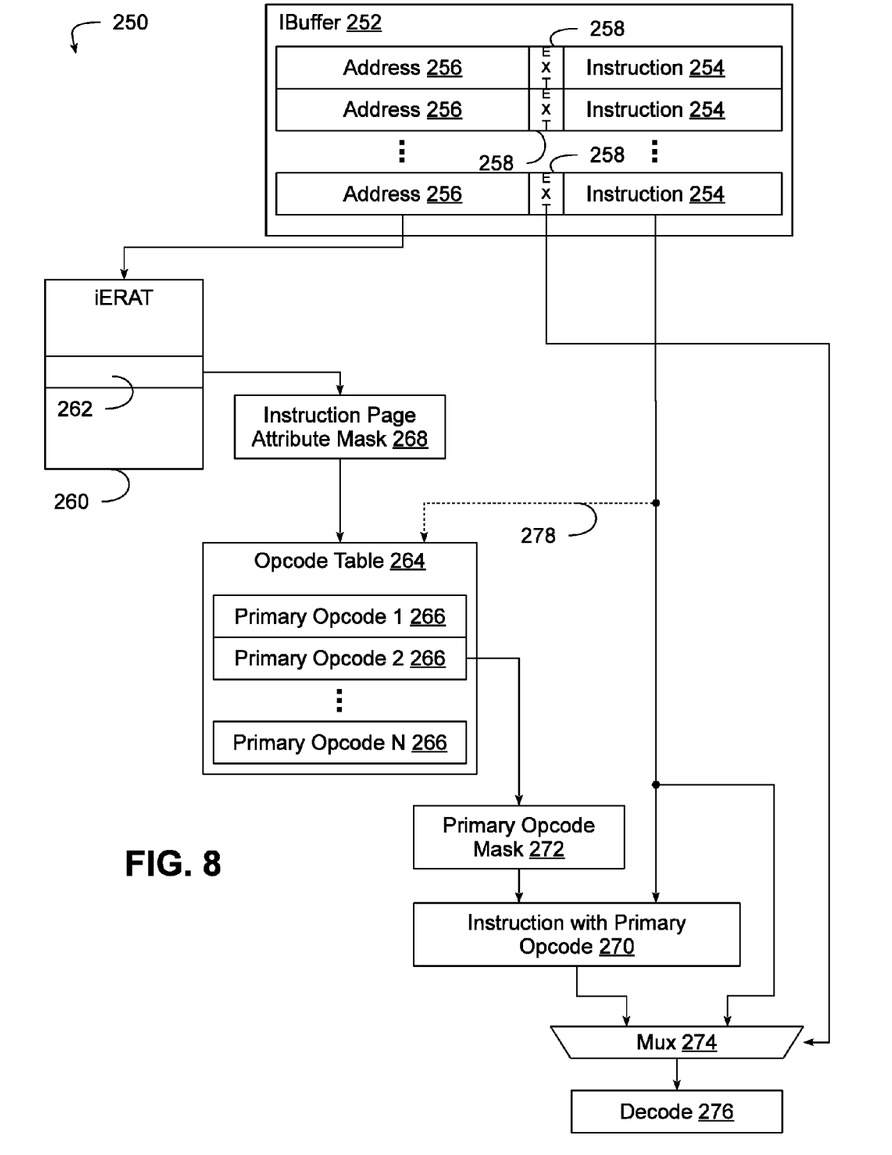
FIG. 8 is a block diagram illustrating an exemplary instruction decode using a data processing system supporting memory address translation-based instruction decode consistent with the invention.

FIG. 8 for example, illustrates an exemplary data processing system 250, and in particular, an exemplary processing core therein, for the purposes of illustrating an exemplary instruction decode that utilizes address translation-based instruction decode consistent with the invention. An instruction buffer 252, e.g., as provided in an issue unit of a processing core, may store a plurality of instructions 254 awaiting execution by the processing core. Each instruction is typically associated with an address 256 in which the instruction is stored in memory. The address is typically a logical address such as an effective or virtual address, and as such defined in an effective or virtual address space, and it will be appreciated that only a portion of the full address, e.g., sufficient bits to map the instruction to a particular PTE, may be stored in the instruction buffer in some embodiments.

Furthermore, in the illustrated embodiment, a single bit of each instruction 254 is defined as an extended decode mode indicator 258, which controls whether the instruction is decoded using conventional decoding or using address translation-based instruction decode consistent with the invention.

For each instruction in instruction buffer 252, an ERAT 260 includes a corresponding PTE 262 (although typically several instructions map to the same PTE at any given time). In the illustrated embodiment of FIG. 8, ERAT 260 is designated an "iERAT" to indicate that it is associated with instructions, and a corresponding dERAT (not shown) may be provided to handle data-related memory accesses.

Whenever an instruction 254 is to be decoded, the address 256 associated with the instruction is used to access a PTE 262 in ERAT 260 to obtain therefrom a memory attribute, and in particular, an index that is used to access an opcode table 264 including a plurality (N) of opcodes 266, e.g., primary opcodes. While opcode table 264 is illustrated as a simple table or array, it will be appreciated that opcode table 264 may be implemented as a hash table, a linked list, or any other suitable data structure.

Opcode table 264 is typically software-writeable, such that a hypervisor, guest, or application may store an array of opcodes suitable for a particular application or workload. In one embodiment, for example, table 264 may be implemented using a plurality of software-writeable special purpose registers.

While not required, in some embodiments it may be desirable to provide an additional instruction page attribute mask 268 that may be used to mask the memory attribute(s) in PTE 262 prior to accessing table 264. Mask 268 may be a software-writeable special purpose register, and may be used, for example, to disable certain instructions and/or lookups into table 264.

A primary opcode 266, indexed by the aforementioned memory attribute, is output from opcode table 264 and merged with all or a portion of the instruction 254 to generate an instruction with primary opcode as shown in block 270. In addition, in some embodiments, it may be desired to provide an optional primary opcode mask 272, which similar to mask 268, is a software-writeable special purpose register, and which may be used to selectively disable, set or clear one or more bits of the primary opcode 266 output from opcode table 264. For example, as noted in memory, instruction 254 may include a subset of a primary opcode, so mask 272 may be used to protect this subset from being overwritten when it is merged with the opcode output by opcode table 264.

Block 270 outputs to one input of a multiplexer 274, while the original instruction 254 is fed to the other input of multiplexer 274. A select input of multiplexer 274 is controlled by the extended decode mode indicator 258 associated with the instruction, and multiplexer 274 outputs to decode logic 276, which completes decoding of the instruction and initiates execution thereof, such that, when the indicator is set, and the extended decode mode is enabled for the instruction, multiplexer 274 outputs the instruction and primary opcode from block 270 for decoding and execution, while if the indicator is not set, and the extended decode mode is disabled for the instruction, the original instruction is output for decoding and execution.

As noted above, in some embodiments, a portion of the instruction, e.g., an immediate field in the instruction, may be used to provide a portion of the bits used to index opcode table 264. As such, an optional data path 278 may be provided to pass a portion of instruction 254 to opcode table 264.

Figure 9:
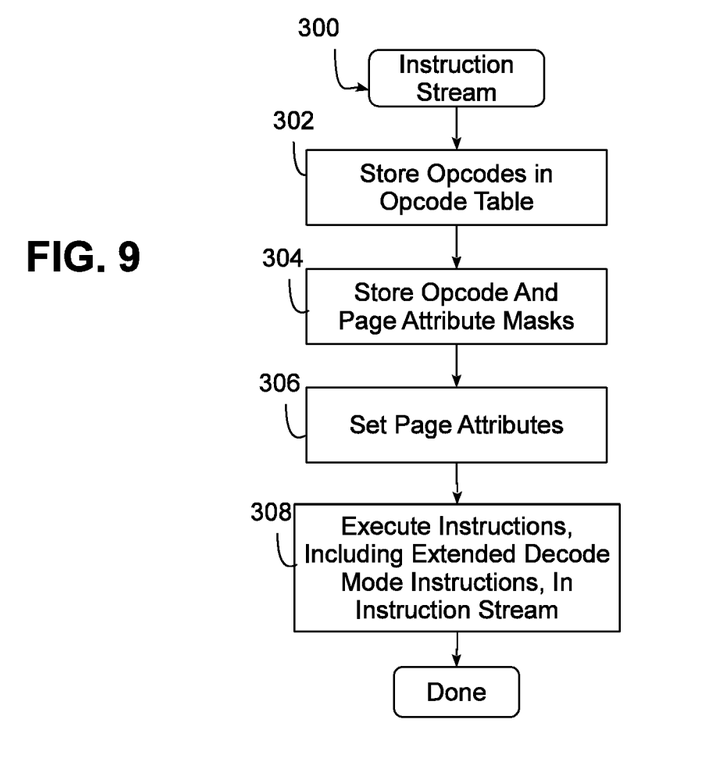
FIG. 9 is a flowchart illustrating an exemplary sequence of operations for executing extended mode instructions in the data processing system of FIG. 7.

FIG. 9 next illustrates a sequence of operations 300 representing an instruction stream executed by a data processing system utilizing address translation-based instruction decode consistent with the invention. As shown in blocks 302-306, a number of setup or initialization operations are typically performed to set up address translation-based instruction decode, including storing the desired opcodes in the opcode table (block 302), storing any opcode and page attribute masks (block 304), and setting page attributes in the PTEs corresponding to the memory pages within which extended decode mode instructions are stored (block 306). It will be appreciated that each of these steps may be performed by an application, or alternatively, may require a supervisory mode entity such as an operating system or hypervisor.

Once set up, instructions in the instruction stream may be executed as illustrated in block 308, with any extended decode mode instructions executed in the manner discussed above in connection with FIG. 7. As one example, the aforementioned Taylor series approximation code discussed above in connection with Tables I and II may be unrolled multiple times and implemented using extended decode mode instructions sharing the same primary opcode and having sub-types such as add, multiply, divide, multiply-add, and compare, and supporting up to 128 registers for each operand.

The disclosed invention therefore allows software to specify primary opcodes outside of the instruction opcode, thereby minimizing the impact of using available instruction decode space and allowing for larger registers to be addressed easily in a microprocessor instruction. Various additional modifications may be made to the disclosed embodiments without departing from the spirit and scope of the invention. Therefore, the invention lies in the claims hereinafter appended.

What is claimed is:

1. A circuit arrangement, comprising:
a processing unit;
a memory address translation data structure for use in performing memory address translation for instructions in an instruction stream being executed by the processing unit, wherein the memory address translation data structure includes a decode-related attribute associated with an instruction from the instruction stream, wherein the instruction is associated with an address at which the instruction is stored in an address space, and wherein the decode-related attribute is accessed using at least a portion of the address; and
decode logic configured to access the decode-related attribute in the memory address translation data structure and decode at least a portion of an opcode for the instruction using the decode-related attribute; and
wherein the memory address translation data structure includes a page table entry associated with the address at which the instruction is stored in the address space.

2. The circuit arrangement of claim 1, further comprising an opcode data structure configured to store a plurality of opcodes, wherein the decode logic is configured to access the opcode data structure using the decode-related attribute to determine the at least a portion of the opcode.

3. The circuit arrangement of claim 2, wherein the opcode data structure comprises a table storing the plurality of opcodes, and wherein the decode-related attribute includes at least a portion of an index used to select an opcode from among the plurality of opcodes.

4. The circuit arrangement of claim 3, wherein the decode logic is further configured to determine a second portion of the index from an immediate field in the instruction.

5. The circuit arrangement of claim 2, further comprising a mask coupled intermediate the memory address translation data structure and opcode data structure and configured to mask the decode-related attribute.

6. The circuit arrangement of claim 2, further comprising a mask coupled to the opcode data structure and configured to mask the at least a portion of the opcode determined from the opcode data structure.

7. The circuit arrangement of claim 2, wherein the opcode data structure is software writeable to store the plurality of opcodes in the opcode data structure in response to at least one instruction executed by the processing unit.

8. The circuit arrangement of claim 1, wherein the decode-related attribute is accessed from the page table entry.

9. The circuit arrangement of claim 1, wherein the instruction includes an extended decode mode indicator that controls whether the at least a portion of the opcode for the instruction is decoded using the decode-related attribute.

10. The circuit arrangement of claim 1, wherein the at least a portion of the opcode comprises a primary opcode, and wherein the instruction includes a secondary opcode that is combined with the primary opcode to decode the instruction.

11. The circuit arrangement of claim 1, wherein the instruction is a 32-bit instruction and includes three 7-bit source operands, a 7-bit target operand and the decode-related attribute.

12. An integrated circuit device comprising:
a processing unit;
a memory address translation data structure for use in performing memory address translation for instructions in an instruction stream being executed by the processing unit, wherein the memory address translation data structure includes a decode-related attribute associated with an instruction from the instruction stream, wherein the instruction is associated with an address at which the instruction is stored in an address space, and wherein the decode-related attribute is accessed using at least a portion of the address; and
decode logic configured to access the decode-related attribute in the memory address translation data structure and decode at least a portion of an opcode for the instruction using the decode-related attribute; and
wherein the memory address translation data structure includes a page table entry associated with the address at which the instruction is stored in the address space.

13. A program product comprising:
a non-transitory computer readable medium; and
logic definition program code stored on the computer readable medium and defining a circuit arrangement comprising:
a processing unit;
a memory address translation data structure for use in performing memory address translation for instructions in an instruction stream being executed by the processing unit, wherein the memory address translation data structure includes a decode-related attribute associated with an instruction from the instruction stream, wherein the instruction is associated with an address at which the instruction is stored in an address space, and wherein the decode-related attribute is accessed using at least a portion of the address; and
decode logic configured to access the decode-related attribute in the memory address translation data structure and decode at least a portion of an opcode for the instruction using the decode-related attribute; and
wherein the memory address translation data structure includes a page table entry associated with the address at which the instruction is stored in the address space.

14. The integrated circuit device of claim 12, wherein the decode-related attribute is accessed from the page table entry.

15. The integrated circuit device of claim 12, further comprising an opcode data structure configured to store a plurality of opcodes, wherein the decode logic is configured to access the opcode data structure using the decode-related attribute to determine the at least a portion of the opcode.

16. The integrated circuit device of claim 15, wherein the opcode data structure comprises a table storing the plurality of opcodes, and wherein the decode-related attribute includes at least a portion of an index used to select an opcode from among the plurality of opcodes.

17. The integrated circuit device of claim 12, wherein the instruction includes an extended decode mode indicator that controls whether the at least a portion of the opcode for the instruction is decoded using the decode-related attribute.

18. The program product of claim 13, wherein the decode-related attribute is accessed from the page table entry.

19. The program product of claim 13, further comprising an opcode data structure configured to store a plurality of opcodes, wherein the decode logic is configured to access the opcode data structure using the decode-related attribute to determine the at least a portion of the opcode.

20. The program product of claim 13, wherein the instruction includes an extended decode mode indicator that controls whether the at least a portion of the opcode for the instruction is decoded using the decode-related attribute.

* * * * *